United States Patent Office 3,667,789
Patented June 6, 1972

3,667,789
ASSEMBLY TOLERANCE CONTROL SPACER
James A. McNeely, Manchester, and Ernest R. Russell, Florissant, Mo., assignors to Moog Industries, Inc., St. Louis, Mo.
Filed Oct. 12, 1970, Ser. No. 79,820
Int. Cl. F16c *11/06*
U.S. Cl. 287—87
10 Claims

ABSTRACT OF THE DISCLOSURE

An assembly tolerance control spacer to absorb or take-up space differences occurring in a product made up of a plurality of components having size or tolerance characteristics which may vary from component to component, the control spacer being included in the assembled product so as to absorb tolerance variations by collapsing more or less to result in a predictable assembly result for the product.

BRIEF DESCRIPTION OF THE INVENTION

This invention relates to a spacer for controlling the build-up or accumulation of manufacturing tolerances in the components of an assembled product, and more particularly to a control spacer of collapsible character which is especially useful in the mass production of uniform products such as ball joints, tie rod ends and other similar movable joint devices for the automotive industry.

The control spacer of the present invention is intended to equalize tolerance variations from product to product where each product is a composite assembly of several components. For an example, in an idler arm without the control spacer of the present invention the tolerance buildup resulting from the individual tolerances of separately formed and manufactured components produces a final assembled product that varies from having the parts fit too tightly or too loosely. Studies have been made on assembly probabilities in which it is found that the majority of the assembled products will not fall in an "acceptable" range. The control spacer of the present invention is intended to eliminate the "unacceptable" probability range of the products.

In its broad aspects the control spacer of this invention is made of a suitable material and has a suitable physical configuration so that it will be capable of absorbing tolerance build-up or tolerance variations by collapsing more or less as dictated by the particular overall tolerance of the components in each individually assembled product. The control spacer must become an integral part of the product so that its absorption of tolerance can be obtained by the spacer collapsing more or less to produce a predictable result. The spacer is collapsible to the extent determined by the tolerance in each stack of components placed in the housing of a product, so that a preload spring or resilient element will produce substantially the same load on the components from product to product. The collapsible control spacer in each product will provide the resilient preload component with a predictable space in which to react.

It is an important object of the present invention to provide a control spacer which is collapsible in response to tolerance build-up in a stack of components to assure 100% assembly acceptance of the products.

It is an object of the present invention to provide an assembly tolerance control spacer which is collapsible as required by assembly tolerance characteristics and is intended to be permanently collapsibly deformed so that no further change in the control spacer can take place in use, whereby the distortion becomes fixed and assumes a usable configuration throughout the life of the assembled product.

It is a further object of the present invention to provide an assembly tolerance control spacer which can be distorted or collapsed to a predetermined height outside of the assembled product or it may be distorted or collapsed during assembly of the product components.

It is still another object of the present invention to provide a control spacer having a physical configuration which permits a uniform collapsing and a resulting substantially fixed physical configuration, such characteristics being obtained by forming the spacer with a series of annular wall segments each of a different circumferential size, and wherein the material of the spacer is of permanently deformable character.

Other objects of the present invention will be more particularly described in the following specification.

BRIEF DESCRIPTION OF THE DRAWINGS

The assembly tolerance control spacer is illustrated in connection with assembled product embodiments that will best exemplify the utility of the spacer, and such embodiments are shown in the accompanying drawings wherein.

DESCRIPTION OF THE INVENTION

Figure 1:
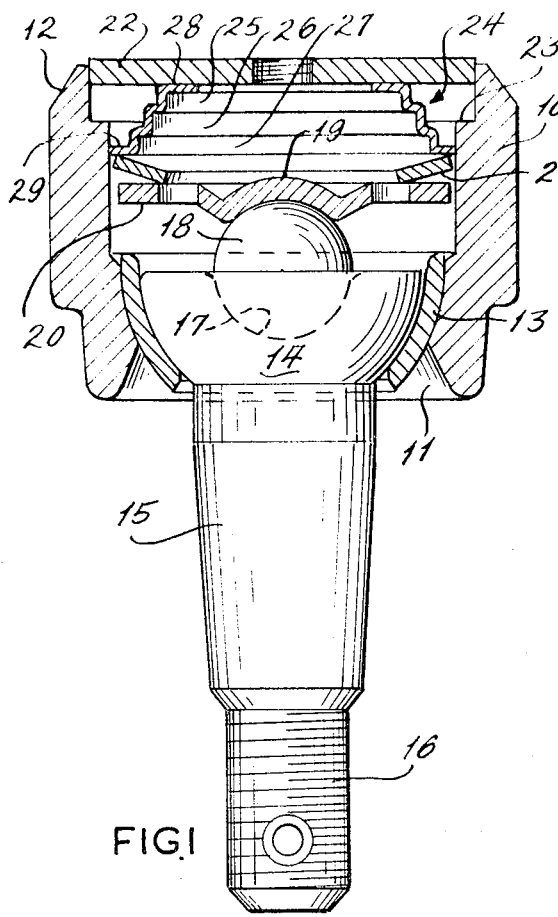
FIG. 1 is a longitudinal sectional elevational view of a tie rod end in which the control spacer is shown in its initial uncollapsed configuration.
Figure 2:
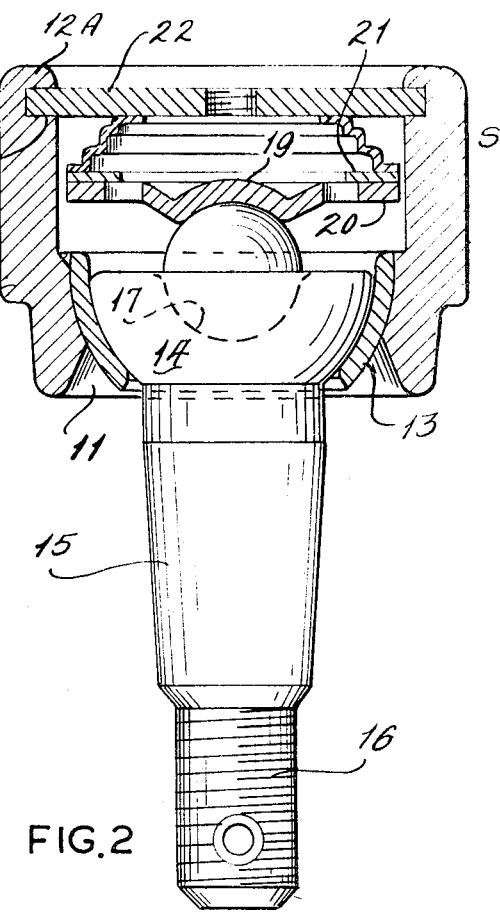
FIG. 2 is a view similar to FIG. 1 but showing the control spacer in its final configuration in the assembly.

Turning now to the several views in the drawing, one embodiment of the invention is shown in FIGS. 1 and 2 as applied to a tie rod end which, in its general configuration, is typical of movable joint devices used for tie rod ends in the automotive art. FIGS. 1 and 2 are similar except that in FIG. 1 the stack of components making up the tie rod end assembly are shown prior to final assembly, while in FIG. 2 the components are shown in there normal final assembly state.

In these views the tie rod end includes a housing 10 having an aperture 11 at one end and an opening in the opposite end defined by a flange 12 which is adapted to be spun over to the position at 12A in FIG. 2. The housing is provided with a bearing element 13 on which the partial spherical head 14 of a typical stud is adapted to swivel or move. The stud 15 has a shank 16 which extends through the aperture 11 of the housing 10 and is adapted to be connected to a load bearing member for the automotive vehicle.

In the example shown here the partial spherical headed end 14 of the stud 15 is formed with a socket 17 to receive a hardened ball element 18. The ball element 18 is engaged by a spherically conformed seat portion 19 of a bearing plate 20 and on the opposite side of the bearing plate 20 there is disposed a resilient pre-load asserting element 21 which in the present case may be a Belleville washer. A closure plate 22 is adapted to fit adjacent the flange 12 and engage on an annular seat 23 at the open end of the housing. Normally the resilient element 21 for asserting a preload on the components would be directly engaged under the closure plate 22 when the closure plate assumes the final assembly position shown in FIG. 2. Under normal conditions the build-up of tolerances between the bearing 13, the headed end 14 of the stud 15, the spherical bearing element 18, the bearing plate 20 and the seat portion 23 of the housing 10 have a pronounced effect on the depth of the space in the housing between the upper face of the bearing plate 20 and the under face of the closure plate 22. The resilient pre-load element 21 in the normal relationship of the assembly of the equivalent stack of components reacts to variations in the depth of such space so that the stud 15 in its final assembly "fit" may be too loose or too tight.

The control spacer of this invention is shown in FIG. 1 as being an element 24 having a series of annular ring sections 25, 26 and 27, each of a different diameter, with the small diameter section 25 integral with an inturned end flange 28 and the large diameter section 27 being adjacent an out-turned flange 29. Each section is characterized by an axially directed portion and a radially directed portion. There may be as few as two annular sections, and in the present case three annular sections are shown, although no limitation is to be implied. Normally, the components of the movable joint device are placed in proper stacked relationship in the housing 10 and the control spacer 24 is placed on top of the resilient pre-load member 21 prior to placement of the closure plate 22.

In FIG. 2 the closure plate is shown moved, as by a suitable pressure applying assembly tool (not shown), down on the seat 23 so that the flange 12 may be spun over to the final position 12a. In this condition the resilient preload element 21 is shown substantially flattened against the pressure plate 20 so that the tolerance build-up of the components up to the top surface of the resilient component 21 is accounted for in determining the remaining space available between the resilient component 21 and the underside or face of the closure plate 22. This space is indicated at S in FIG. 2. It should be appreciated by those skilled in the art that the depth of the space S can vary depending on the tolerance factors applicable to the particular stack of components in the housing 10. The variation in the depth of the space S is accommodated by the collapse or crushing reaction of the control spacer 24 so that the spacer takes a permanent collapsed "set" and there is no spring-back or resilient reaction to the crushed state which it assumes in the position shown in FIG. 2. In this manner each control spacer 24 will crush more or less depending on the variation in the tolerances in the stack of components put in each housing 10, and in each case the pre-load resilient element will have a predictable reaction as wear takes place between the socket 19, the spherical ball 18 and the socket 17 in the headed end of the stud 15, as well as wear that may occur between the headed end 14 of the stud and its surface in the bearing 13.

In view of the drawing it is evident that the resilient member maintains a portion of the spaced distance between the closure plate and a wear plate on the stud head.

Figure 4:
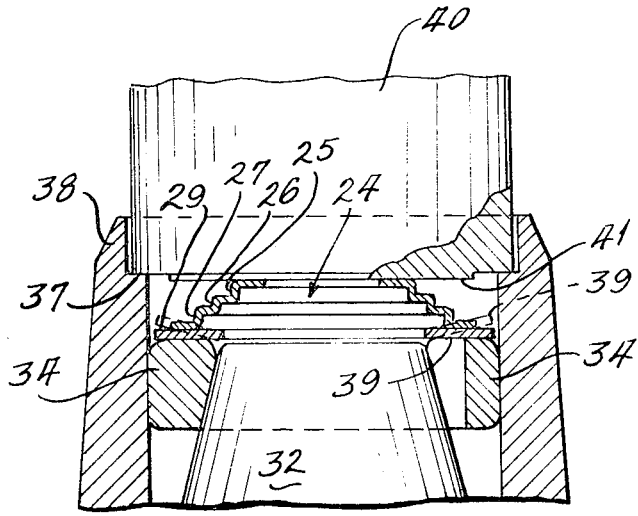
FIG. 4 is a greatly enlarged fragmentary sectional view of the method of assembly of components in the idler arm shown in FIG. 3, the view being taken prior to the final assembly to show the pre-conditioning of the control spacer in a typical case.
Figure 3:
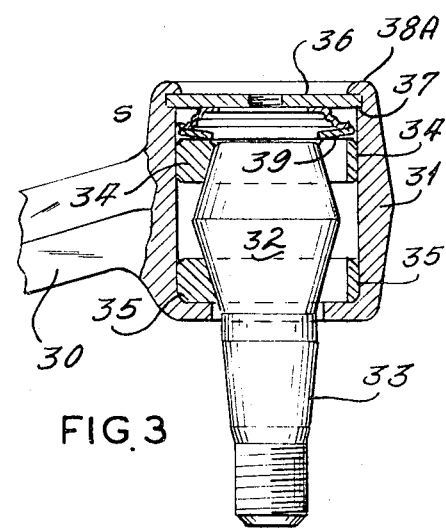
FIG. 3 is a partial embodiment shown in fragmentary sectional elevation of an idler arm wherein the present control spacer is incorporated in its final or collapsed configuration.

Turning now to FIGS. 3 and 4, there is shown a typical idler arm 30 having a housing 31 at one end in which the headed end 32 of a stud 33 is mounted in suitable bearing segments 34 and 35. There are normally three bearing segments 34 and a similar number of segments 35, much as is seen in Scheublein U.S. Patent No. 3,429,598, issued Feb. 25, 1969. The view of FIG. 3 is of the stack of components in the housing 31 in their final assembled position where the closure plate 36 is held in position on the seat 37 by the flange 38a being closed over from the starting position of the flange 38 in FIG. 4.

Turning now to FIG. 4, it can be seen that the upper end of the stud head 32 is seated in the bearing segments 34 and a resilient element 39 is engaged on the outer surface of the bearing segments 34. Spacer 24 is placed on top of resilient element 39 so as to be in position for contact by the working face of a ram 40 powered in any conventional manner. The ram face is provided with an extension 41 of suitable thickness but of lesser diameter than the ram body so it will pass below the housing shoulder or seat 37 and allow the ram to bottom on said seat. The extension 41 engages the spacer element 24 and collapses it to a predetermined level below seat 37. The result is that there is formed a predetermined working space for the preload element 39, depending on desired initial conditions. After the ram 40 has pre-collapsed the element 24, it is withdrawn and the closure plate 36 is placed in position and the flange 38 is closed over to position 38a as in FIG. 3.

Upon applying a suitable closure pressure to the plate 36 to drive it down on the seat 37, the resilient component 39 is moved to its predetermined position so that the final closed space S (FIG. 3) between the upper surfaces of the bearing segments 34 and the under surface of the closure plate 36 will accommodate the collapsed control element 24 and the resilient preload element 39 with the thickness of the ram extension 41 providing the predetermined extra space in which element 39 may work. Of course, the accumulation of tolerance in the stack of components in the housing 31 is accounted for because the control spacer 24 will collapse more or less in accordance with the tolerance variations so that predictable space is formed to provide the preload resilient component 39 with a space condition in which its response will be the same from assembly to assembly.

In the assembly described above, it should be understood that the control spacer is essentially a member that can be deformed under a predictable load to any height within its minimum and maximum range of collapse, and once deformed will not change or be subject to further deformation regardless of its previous resistance to deformation. Consequently, it will compensate for various tolerance build-up or tolerance accumulations within a stack of components. In the case of movable joint devices it is desirable to have a resilient component for asserting a preload between the housing and the projecting stud so that there will not be excessive freedom of movement between these two major components which make up the load input and output sides of the assembly, such as the housing and the stud. However, this resilient member should be chosen such that it will require less pressure to deflect to its predetermined height than the pressure required to collapse the spacer element.

The control spacer of this improvement may be made of suitable metallic materials which are non-resilient so that after being permanently deformed or collapsed, a definite measurement will be retained for the purpose of obtaining the predictable space dimension heretofore referred to. The type of material, the thickness of the material and the number of annular sections may vary depending on the collapsing pressure that is encountered. In all instances the pressure applied by ram 40 to the spacer to put it in the initial collapsed position would be several times greater than the internal force which is to be accommodated between the major load input and output components. This is important so that the control spacer will not be further collapsed by the working load or force transfer conditions to result in the stack of components becoming too loose. It is pointed out that the configuration of a series of annular ring sections is chosen to provide the largest possible collapsing deflection at a relatively uniform or even rate of load application. The use of a plurality of annular sections provides several places for permanent distortion to occur or to be accumulated without encountering a basic change of configuration of the control spacer and this is done to keep the rate of collapse substantially constant.

Having set forth the principles of the present assembly tolerance control spacer and having shown certain commercial embodiments thereof, it should be understood that changes and modifications may be inferred from this disclosure and it is intended that these modifications shall be included wtihin the principal teaching.

What is claimed is:

1. In a load transfer movable joint device, a first load sustaining member having a bearing seat and a shoulder spaced from said bearing seat; a second load sustaining member having a headed end engaged upon said bearing seat and a portion projecting from said first member; said headed end having relative movement in said bearing seat where wear may occur; a permanently deformable tolerance control element deposited in said first member adjacent said shoulder; a resilient wear take-up element between said deformable element and said headed end of said second member, and maintaining a portion of the spaced distance between the proximate ends of said deformable element and said headed end taken along the axis of said second member; and a closure plate permanently seated on said shoulder to retain said elements in said first member, said element being deformed to a predetermined dimension relative to the position of said shoulder and in accordance with the total tolerance characteristics of the joint device to result in a substantially uniform engagement of said headed end upon said bearing seat, and said resilient wear take-up element being operable to force said deformable element against said closure plate.

2. The device set forth in claim 1 wherein said control element has a plurality of annular wall segments of different diameters to accommodate permanent collapsible deformation.

3. The device set forth in claim 1 wherein said control element has a plurality of annular wall segments of progressively dicerent diameters to accommodate permanent collapsible deformation.

4. The device set forth in claim 1 wherein said control element is an integrally formed member composed of a plurality of ring sections in axial stacked relation and varying in diameter from small at one end to large at the other end, said ring sections permanently collapsing in telescoping relationship.

5. In a movable joint device, a first member consisting of a housing open at one end defined by an annular flange and a seat surface axially inwardly of said flange, a second member operative in said housing and engaged therewith to transfer load, a resilient member in said housing disposed in abutment operative with said second member and spaced from said seat surface, a housing closure plate disposed on said seat surface and retained by closing said annular flange thereover, tolerance control means abutting between said closure plate and resilient member, said resilient member maintaining a portion of the spaced distance between the proximate ends of said tolerance control means and said second member taken along the axis of said second member, said control means being formed of material permanently precollapsed in position in said device to absorb tolerance accumulation in said joint device and provide a substantially uniform working reaction between said first and second members.

6. The assembly set forth in claim 5 wherein said control means is formed of metallic material.

7. The assembly set forth in claim 5 wherein said annular wall segments of said control means permanently collapse in random telescopic reaction to loading from said closure plate and take a permanent set.

8. The assembly set forth in claim 5 wherein said control means is formed with a series of decreasing diameter annular wall segments having radial and axial portions integrally connected.

9. The assembly set forth in claim 8 wherein said series of wall segments includes at least two axial portions.

10. A movable joint device consisting of a plurality of parts which include: a housing having a bearing seat and a shouldered seat spaced from each other; a stud having a headed end engaged upon said bearing seat; a bearing plate seated on said stud head opposite to said bearing seat and spaced from said shouldered seat a distance determined by the tolerances in the parts; a closure plate seated on said shouldered seat in permanent position to define an outer limit to the dimension of the space in said housing; and a preload resilient element and a tolerance control element operatively disposed in the housing space between said bearing plate and said closure plate, said preload and tolerance element being in stacked abutting relation and each maintaining a portion of the spaced distance between the proximate ends of said plates taken along the axis of said stud, said control element being permanently deformed and held by said resilient element against one of said plates, the permanent deformation being such that the control element provides a substantially uniform engagement of said stud head on said bearing seat.

References Cited

UNITED STATES PATENTS

| | | | |
|---|---|---|---|
| 3,350,121 | 10/1967 | Townsend | 287—90 C |
| 1,311,473 | 7/1919 | Vossler | 85—50 R |
| 2,883,221 | 4/1959 | Latzen | 287—87 |
| 3,285,120 | 11/1966 | Kartiala | 85—62 |

FOREIGN PATENTS 910,845  11/1962  Great Britain _____ 287—90 C

ANDREW KUNDRAT, Primary Examiner

U.S. Cl. X.R.

29—149.5